United States Patent [19]
Boppel et al.

[11] Patent Number: 5,459,297
[45] Date of Patent: Oct. 17, 1995

[54] METHOD AND APPARATUS FOR MANUFACTURING A TEXTURE DRUM

[75] Inventors: Wolfgang Boppel, Preetz; Gerald Sermund; Michael Wilharm, both of Kiel, all of Germany

[73] Assignee: Linotype-Hell AG, Eschborn, Germany

[21] Appl. No.: 39,396

[22] PCT Filed: Oct. 3, 1991

[86] PCT No.: PCT/DE91/00784

§ 371 Date: Mar. 24, 1993

§ 102(e) Date: Mar. 24, 1993

[30] Foreign Application Priority Data

Oct. 5, 1990 [DE] Germany .......................... 40 31 545.2

[51] Int. Cl.$^6$ .............................. B23K 15/00; B23K 15/08
[52] U.S. Cl. ................. 219/121.25; 219/121.26; 219/121.17; 219/121.2
[58] Field of Search ......................... 219/121.16, 121.17, 219/121.20, 121.19, 121.25, 121.26, 121.27

[56] References Cited

U.S. PATENT DOCUMENTS

| | | | |
|---|---|---|---|
| 3,371,190 | 2/1968 | Meyer | 219/384 |
| 3,404,254 | 10/1968 | Jones | 219/121 |
| 3,773,565 | 11/1973 | Pye et al. | 148/1 |
| 4,348,576 | 9/1982 | Anderl et al. | 219/121 EW |
| 4,393,295 | 7/1983 | Beisswenger et al. | 219/121 EJ |

FOREIGN PATENT DOCUMENTS

| | | |
|---|---|---|
| 0119182 | 9/1984 | European Pat. Off. . |
| 902850 | 9/1945 | France . |
| 1518224 | 3/1968 | France . |
| 2354323 | 5/1974 | Germany . |
| 2840702 | 4/1979 | Germany . |

OTHER PUBLICATIONS

Optik, vol. 77, No. 2, Sep., 1987, W. Boppel, "Schnelles Elektronenstrahlgravierverfahren zur Gravur von Metallzylindern", pp. 83–92.

Stahl Und Eisen, vol. 110, No. 3, Mar. 14, 1990, R. Pankert; "Aufrauhen von Arbeitswalzen in Kaltwalzwerken" pp. 83–92.

Patent Abstracts of Japan, vol. 12, No. 445, Nov. 22, 1988, Yoshio Yamane "Surface Roughening Device For Rolling Roller".

*Primary Examiner*—Mark H. Paschall
*Attorney, Agent, or Firm*—Hill, Steadman & Simpson

[57] ABSTRACT

In the implementation of the method for after-treatment of a texture drum wherein a surface structure is generated in the region of a surface with an electron beam, the texture drum, following a charging occurring within a working interval with an electron beam having an energy density that generates a recess, is charged during an after-treatment interval by an electron beam having an energy density which leaves the surface structure essentially as it was formed.

11 Claims, 7 Drawing Sheets

METHOD AND APPARATUS FOR MANUFACTURING A TEXTURE DRUM

RELATED APPLICATIONS

This application is related to the following two applications, both being filed simultaneously herewith: Wolfgang Boppel et al application entitled "METHOD AND APPARATUS FOR MANUFACTURING TEXTURE DRUMS", U.S. Ser. No. 08/050,962, International Application No. PCT/DE91/00785; and Wolfgang Boppel et al application entitled "METHOD AND APPARATUS FOR MANUFACTURING TEXTURE DRUMS", U.S. Ser. No. 08/030,459, International Application No. PCT/DE91/00786.

BACKGROUND OF THE INVENTION

The invention is directed to a method for manufacturing a texture drum, whereby a surface structure is produced in the surface region of the texture drum with an electron beam. The invention is also directed to an apparatus for the implementation of the method.

In the past, various methods have been employed for manufacturing such texture rollers or skin-pass rollers that, in particular, are employed for producing a surface structure in the region of sheet steel. On the one hand, particle charging with steel pellets corresponding to a scrap metal shot occurred. Second depressions were implemented in the surface region of the texture drum with the assistance of electro-erosion or with the assistance of lasers. The electro-erosion and the particle charging with steel pellets, however, lead to depressions limited with sharp edges whose edge regions tend to break off and, thus tend to develop dust. Over and above this, an oxidation of the drum metal and, thus, a formation of ash arise in electro-erosion and in laser charging. The number of depressions to be produced on the drum surface when carrying out a processing with lasers is limited by the inertia of the mirrors employed.

German Published Application 28 40 702 discloses a method and an apparatus for improving the quality of fine sheet steel. It is recited in this publication that a surface structure on the drum surface occurs with the assistance of an intermittent energy beam along a helical path. In particular, it is recited that a laser beam can be employed as an energy beam. However, it is also already pointed out that an electron beam can be fundamentally employed. Specific teachings directed to the execution of a method upon employment of an electron beam or for building an apparatus that employs this method are not, however, provided.

EP-A-0 119 182 discloses that a drum surface is charged with the assistance of a laser beam or an electron beam. A helical path in the region of the drum is produced with the assistance of this radiation. In particular, it has been envisioned here to blow a gas, for example oxygen, into the region of the beam charging. An oxidation of the drum metal occurs in the region of the beam charging due to the presence of oxygen. The formation of a crater wall that surrounds a recess generated by the radiation is thereby largely avoided since the material evaporating from or hurled from the recess in a liquid state reacts very quickly with the oxygen.

French Patent 902 850 discloses that a surface structuring be implemented in the region of a texture drum with the assistance of laser emission and that the employment of mirrors is to be avoided since the texture drum to be charged is rotationally and translationally moved past a stationary laser.

The texture drums manufactured with the known method do not allow any satisfactory useful lives since an intensification of the pressing power during operation is required due to a relatively quickly decreasing roughness of the drum surface. This higher pressing power, however, leads to other sheet metal properties, particularly to changes of the hardness and in the bending properties. Since these changes occur during production, constant product properties cannot be guaranteed.

SUMMARY OF THE INVENTION

It is therefore an object of the present invention to improve a method of the type initially cited such that a surface structure that withstands high loads is produced.

With respect to the method, this object is inventively achieved in that the region of the surface 1 of the texture drum 2 is charged by the electron beam 13 within working intervals 60 with an energy density that respectively generates the surface structure in the form of recesses 22 and is charged during after-treatment intervals (64) following the working interval 60 with a lower energy density that leaves the surface structure as it was formed. An advantageous apparatus for the implementation of the method is is also provided.

The assistance of this method makes it possible to generate an extremely uniform surface structure in the region of a crater wall surrounding the recess while avoiding sharp edges and projections. Avoiding these formations has the particular advantage that the surface structure is subject to only slight changes in shape when charging sheets and a long-lasting, uniform charging is thus guaranteed. Over and above this, avoiding edges and projections has the advantage of preventing parts of material from breaking off. In addition to a variation of the surface structure, this breakage would also particularly result in the creation of dust. It is not only steel plates but any other desired, deformable materials, for example sheet aluminum, that can be charged with the assistance of texture drums manufactured according to the method. The extremely uniform surface structure producible with the assistance of the method makes it possible to arrange a uniform oil film in the region of the surface of a charged sheet, this being particularly advantageous given deep-drawing deformations. Over and above this, the surface structure, however, also lends coatings of the sheet, for example lacquerings, good adhesion.

It is provided in a preferred embodiment of the invention that a melting of at least the crater wall is implemented during the after-treatment. This melting leaves the surface structure essentially as it was formed but, due to the compensating forces within a metal melt, leads to an essentially steady course of the surface. A flat formation of both the recess as well as of the crater wall and, thus, a loadable surface structure result therefrom.

It is provided in another preferred embodiment of the invention that the electron beam is focused during the working interval and is defocused during the after-treatment interval. The variation of the energy density of the electron beam with the assistance of a focusing has the advantage that the variations in the energy density can occur with extremely short time delays and that ionization effects along the beam propagation are subjected to only insignificant variations. A good reproducibility and avoiding transient responses that have a noticeable influence on the electron propagation result therefrom.

It is provided in another embodiment of the invention that an essentially constant sharpness setting of the electron beam is provided both during the working interval as well as during the after-treatment interval. This constant sharpness setting results in an ion equilibrium being present during the entire processing event, this being required for generating an exactly reproducible surface structure. A disturbance of the ion equilibrium would have the disadvantage that the working frequency of an apparatus working according to the method would be reduced by the respective appearance of compensation events.

It is provided in another preferred embodiment that a follow-up of the electron beam matched to the relative motion between the texture drum and the recording element generating the electron beam is implemented at least during the generation of a recess in the surface region of the texture drum. It thereby becomes possible to generate extremely symmetrical formations of the recesses and of the crater walls. Privileged directions that occur in the region of a sheet processed with the texture drum and that would negatively influence a liberality in the processing of the sheet are thereby avoided.

Further details of the present invention derive from the following description and from the attached drawings in which preferred embodiments of the invention are illustrated by way of example.

DESCRIPTION OF THE PREFERRED EMBODIMENTS

Figure 1:
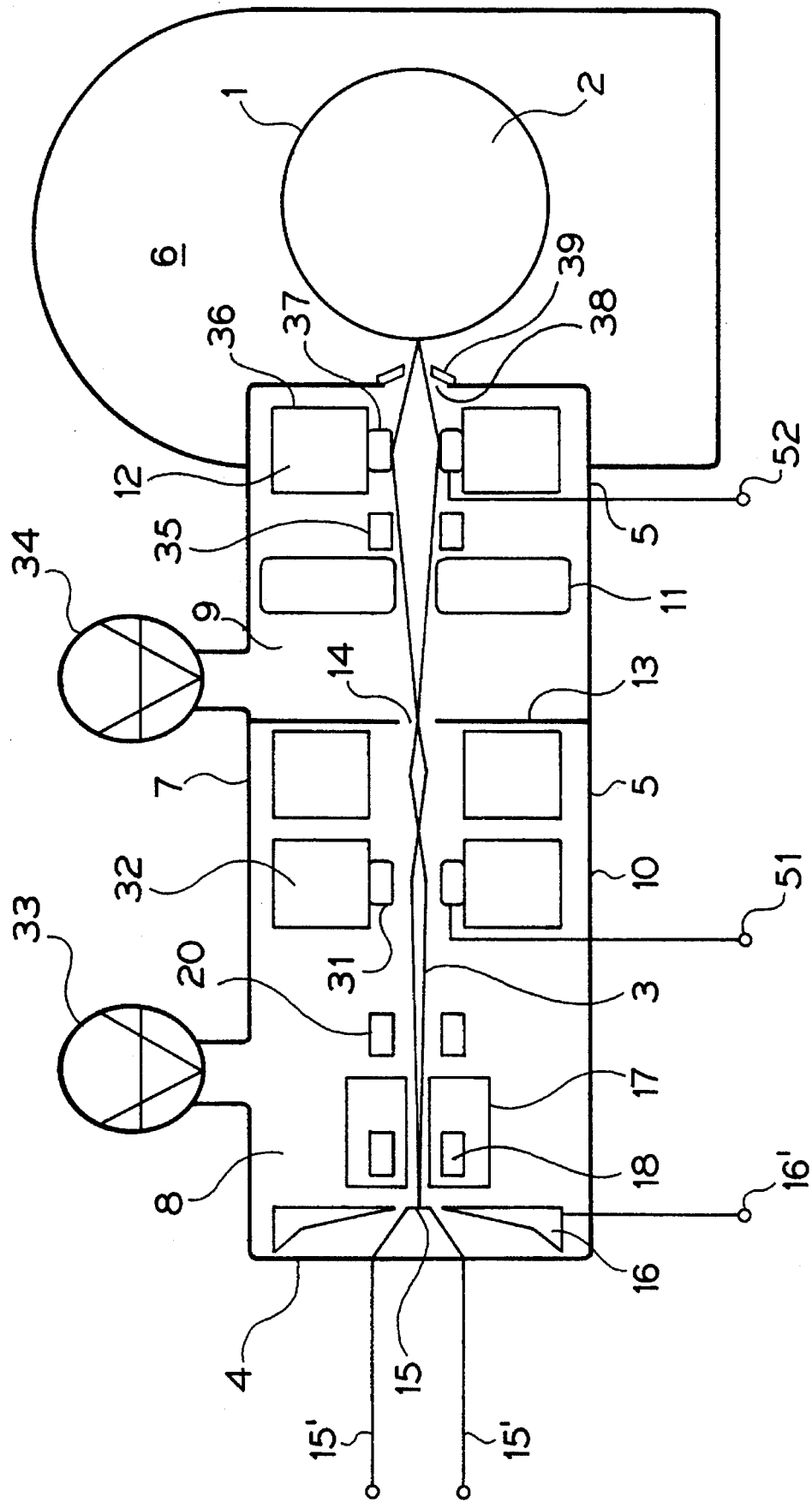
FIG. 1 is a schematic illustration of an apparatus for the manufacture of a surface structure.

FIG. 1 shows a schematic illustration of an apparatus for manufacturing a surface structure in the region of a surface of a texture drum 2. The apparatus is essentially composed of a beam generator 4 that generates an electron beam 3, of a lens system 5 as well as of a vacuum chamber 6 that accepts the texture drum 2. The beam generator 4 and the lens system 5 are arranged in the region of a beam means 7 that is subdivided into a main chamber 8 and into an intermediate chamber 9. The beam generator 4 as well as a focal length setting 10 that is designed as part of the lens system 5 are arranged in the main chamber 8. It is essentially a changeable diaphragm 11 as well as a focusing 12 that are arranged in the region of the intermediate chamber 9, these forming the critical elements of the lens system 5 in common with the focal length setting 10. The main chamber 8 is separated from the intermediate chamber 9 by a vacuum choke 13 that comprises a recess 14 essentially centrally arranged and allowing the passage of the electron beam 3. The vacuum choke 13 makes it possible to provide different pressure conditions in the region of the main chamber 8 and of the intermediate chamber 9. For example, it is thus possible to provide a pressure of approximately 8×0.00001 bar in the region of the main chamber 8 and a pressure of approximately 8×0.001 bar in the region of the intermediate chamber 9.

Figure 2:
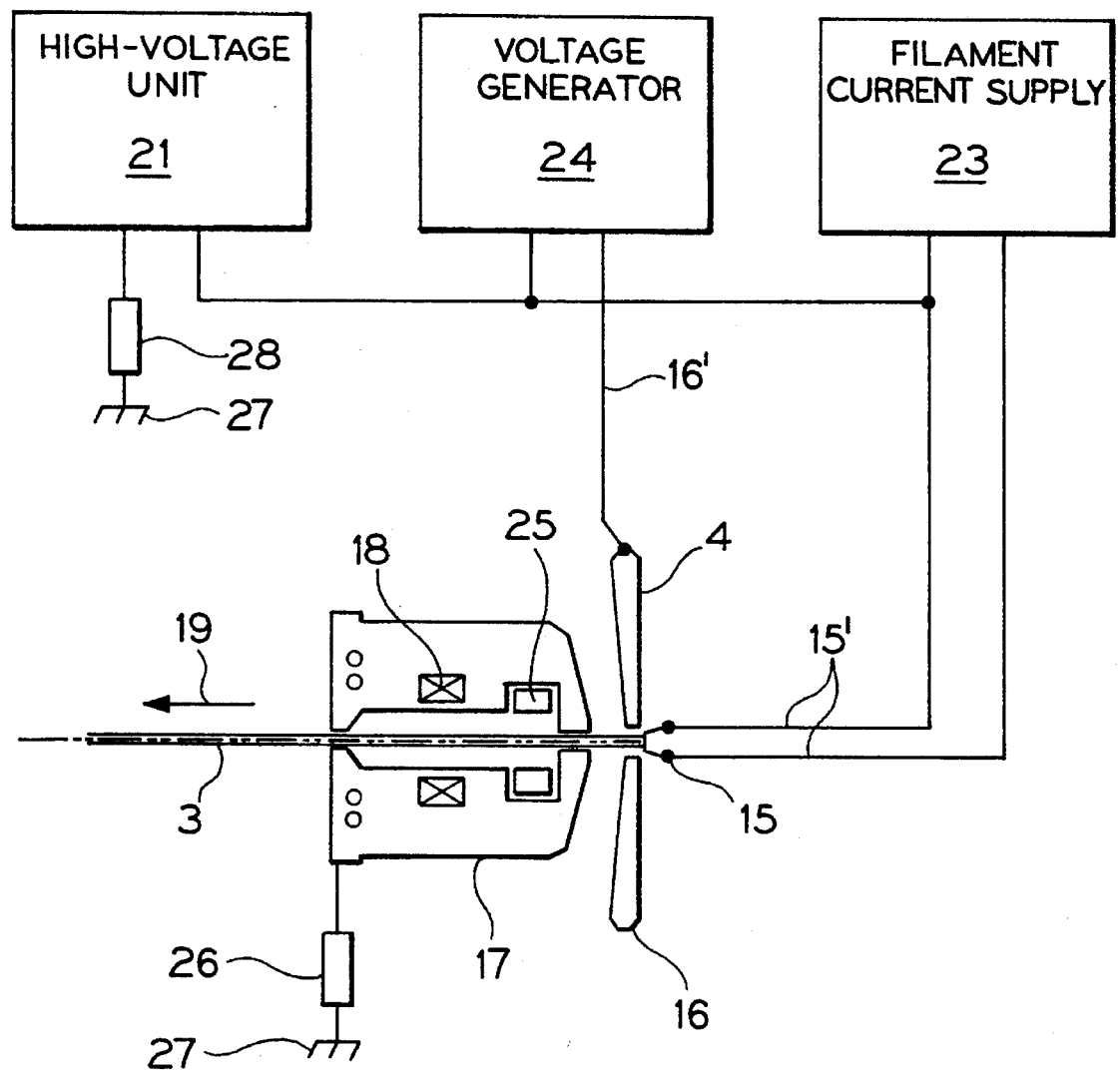
FIG. 2 is a schematic illustration of the beam generating.

The beam generator 4 is essentially composed of a cathode 15, of a Wehnelt cylinder 16, as well as of an anode 17. An anode centerer 18 that focuses the electron beam 3 is arranged in the region of the anode 17. A sequential centerer 20 that likewise undertakes a focusing of the electron beam 3 and avoids scatter losses is arranged following the anode 17 in the propagation direction of the electron beam 3. The cathode 15 is connected via a line 15' to a high-voltage unit 21 (FIG. 2) that generates a voltage up to approximately −50 kilovolts. A typical value lies at approximately −35 kilovolts. Given such a voltage, recesses 22 having a typical depth of approximately 7 micrometers can be produced per microsecond in the region of the surface 1. Given a reduction of the high-voltage to approximately −25 kilovolts, the typical depth of the recess 22 (FIG. 4) amounts to approximately 3 through 4 micrometers per microsecond. Over and above this, the cathode 15 is connected to a filament current supply 23 (FIG. 2). The Wehnelt cylinder 16 is fed via a line 16' by a voltage generator 24 that generates a potential of approximately −1000 volts in comparison to the voltage adjacent at the cathode 15. An ion trap 25 that diverts ions appearing in the region of the anode 17 out of the region of the electron beam 3 is provided in the region of the anode 17 next to the centering coils that form the anode centerer 18. The anode 17 is connected via a resistor 26 to a grounding terminal 27. Over and above this, the high-voltage unit 21 is also connected in the region of a reference terminal to ground via a resistor 28. In particular, tungsten wires are suitable as the material for the cathode 15.

Figure 4:
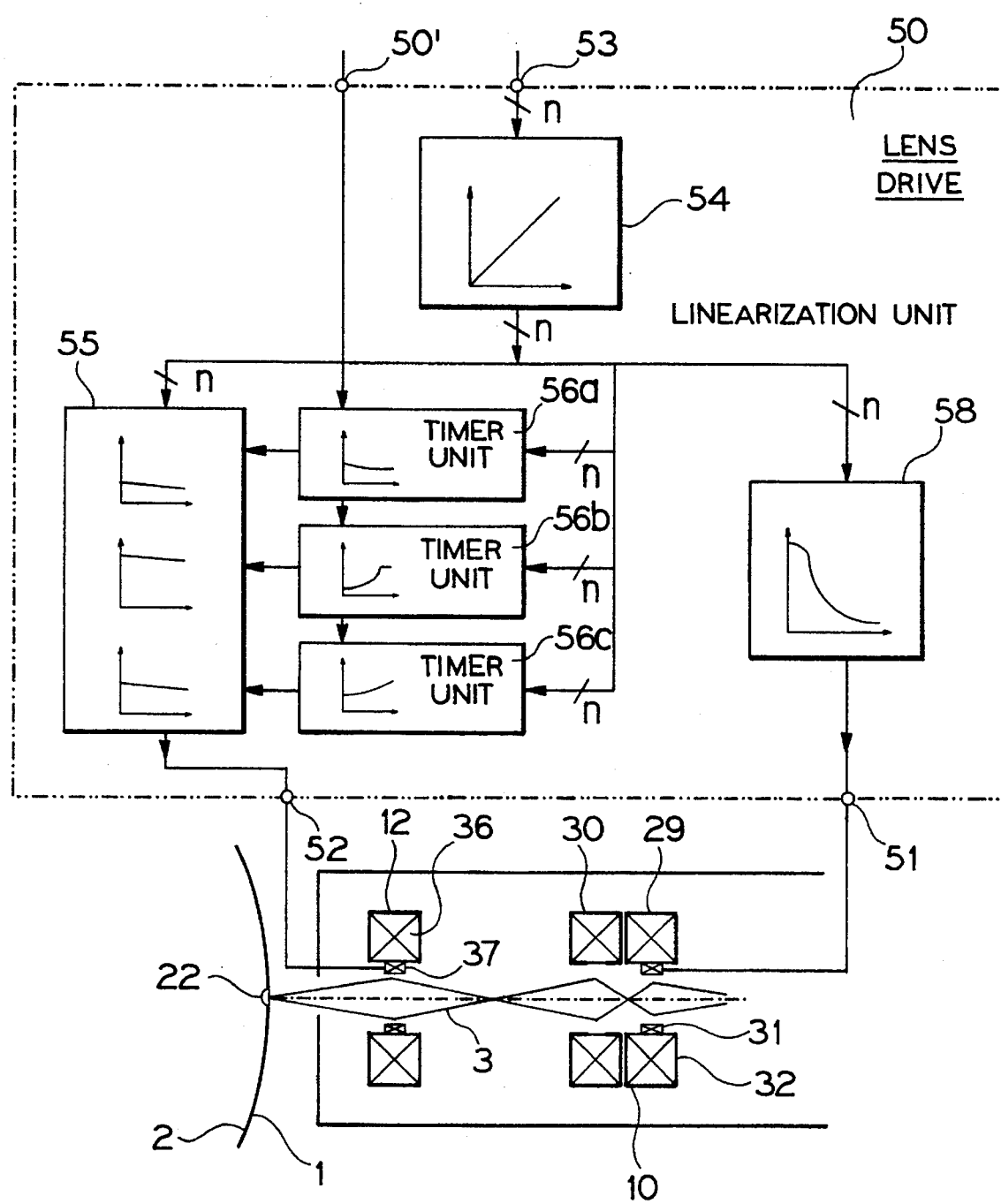
FIG. 4 is a block circuit diagram of the lens drive.
Figure 5:
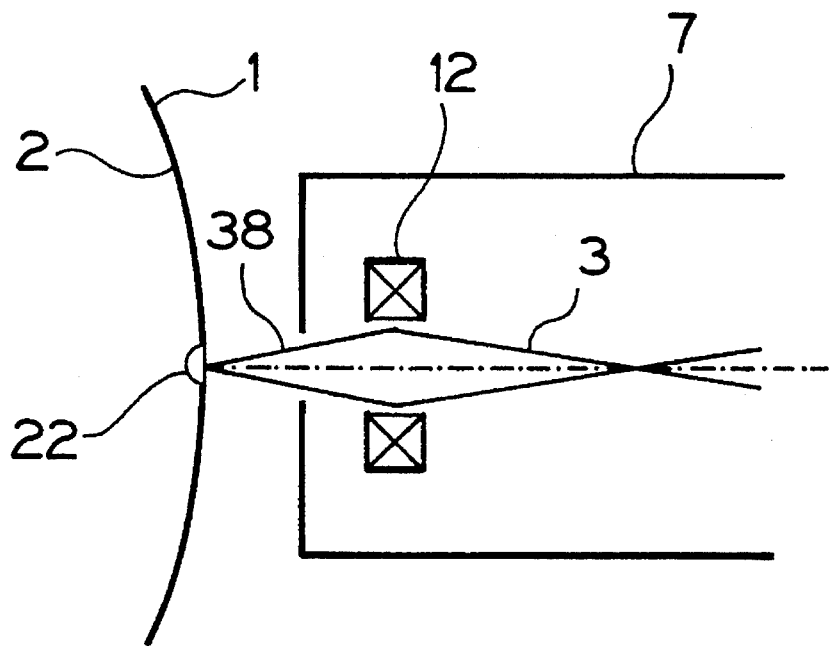
FIG. 5 is a schematic illustration of a focused electron beam.
Figure 6:
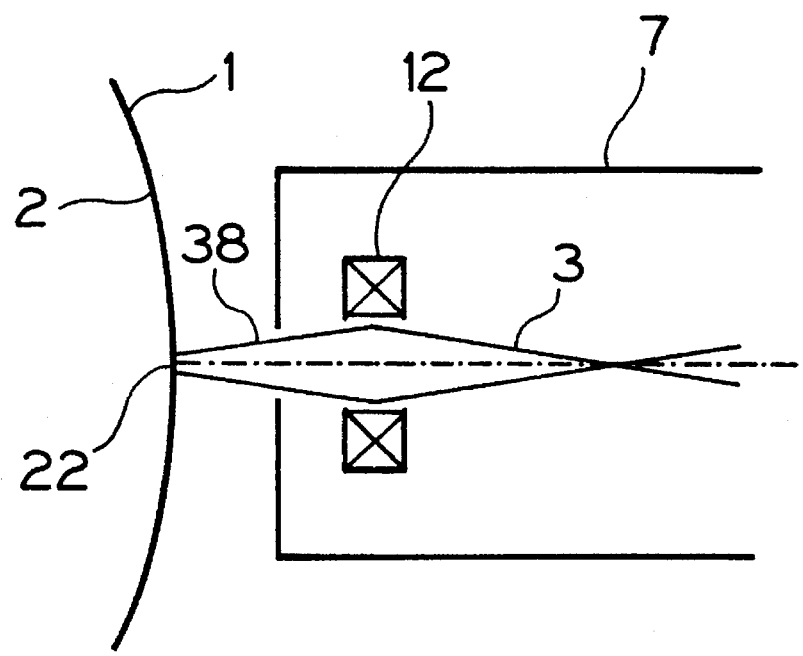
FIG. 6 is a schematic illustration of a defocused electron beam.
Figure 7:
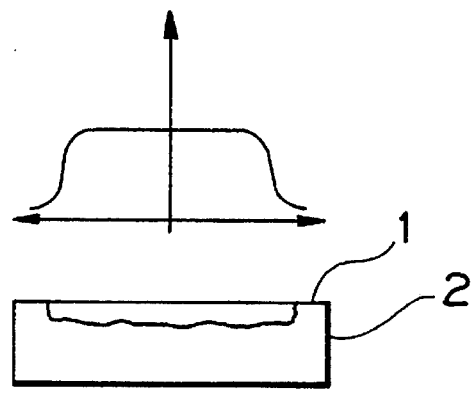
FIG. 7 is an allocation of an electron beam intensity to a charged surface during a pre-treatment.

The focal length setting 10 is constructed of a first zoom lens 29 as well as of a second zoom lens 30 that are arranged following one another in the direction 19 (FIG. 4). The first zoom lens 29 is composed of a dynamic lens 31 as well as of a static lens 32. The second zoom lens 30 is designed without a dynamic lens 31. The vacuum in the region of the main chamber 8 is maintained by a vacuum pump 33 and the vacuum in the region of the intermediate chamber 9 is maintained by a vacuum pump 34 (FIG. 1). In particular, it has been envisioned to design the pumps 33, 34 as turbomolecular pumps. A centerer 35 that avoids scatter losses of the electron beam 3 is provided in the region of the intermediate chamber 9 between the changing diaphragm 11 and the focusing 12. The focusing 12 is essentially composed of a static lens 36 and of a dynamic lens 37. The dynamic lenses 31 and 37 are each respectively arranged in the region of the inside surfaces of the static lenses 32, 36 facing toward the electron beam 3. At that side facing toward the vacuum chamber 6, the means 7 comprises an exit opening 38 in which a nozzle 39 is arranged.

Figure 3:
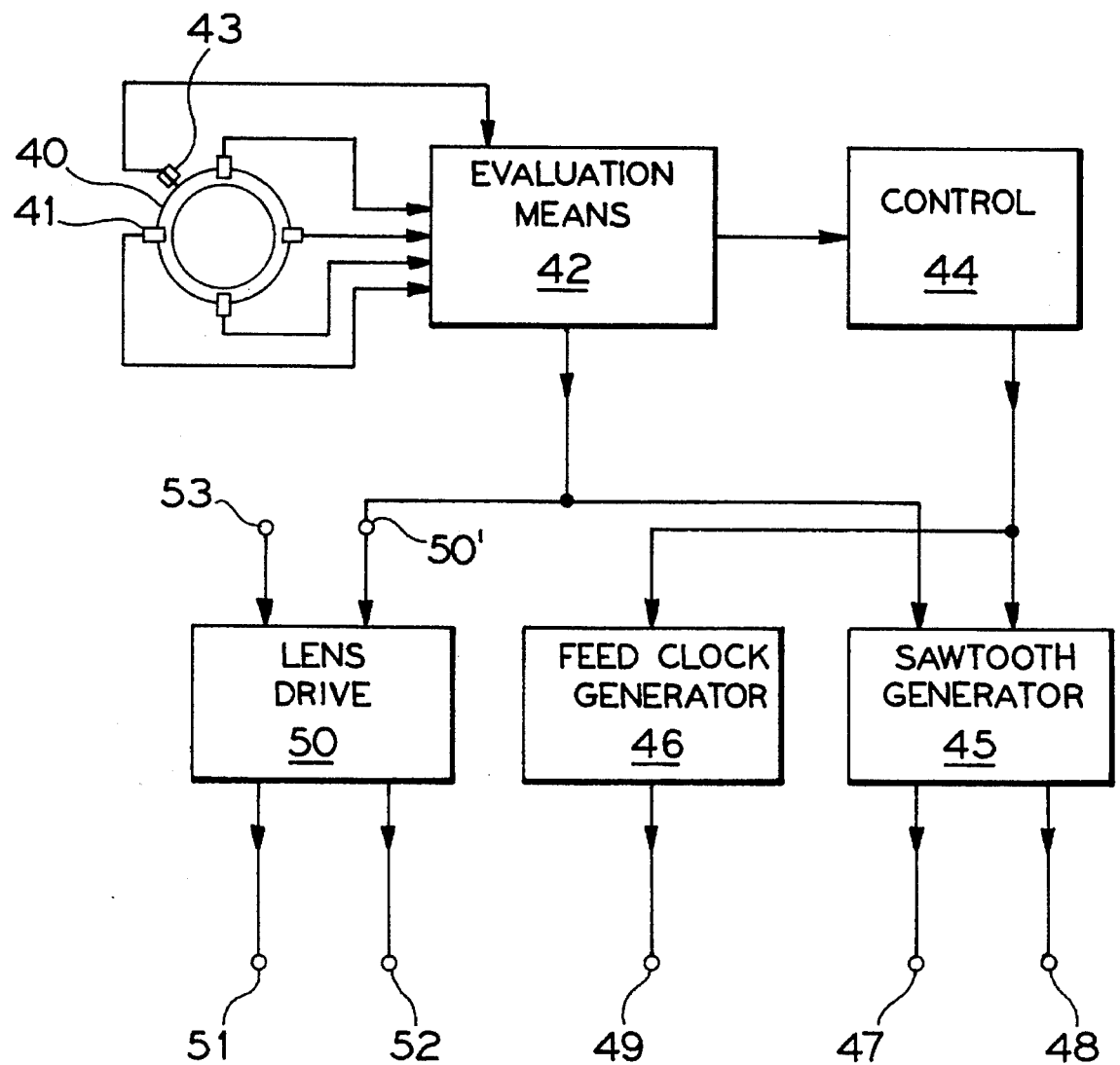
FIG. 3 is a block circuit diagram of the control of the apparatus.

For controlling the reproducible positioning of the recesses 22 on the surface of the texture drum 2, a grid disk 40 synchronized with the rotational motion of the texture drum 2 is provided, this grid disk 42 being connected to an evaluation means 42 via a pick-up 41 (FIG. 3). The evaluation means 42 makes a clock available for following control elements, this clock enabling an exact acquisition of a current orientation of the texture drum 2. A defined definition of a reference point occurs with the assistance of a zero point acquisition means 43. The evaluation means 42 is connected to a control 44 that, for example, can be designed as a phase-locked-loop circuit. The control 44 supplies a sawtooth generator 45 as well as a feed clock generator 46. The sawtooth generator 45 comprises an engraving sawtooth terminal 47 as well as feed sawtooth terminal 48. The feed clock generator 46 is provided with a feed stepping motor terminal 49. The evaluation unit 42 is connected to the sawtooth generator 45 and is connected via a control terminal 50' to a lens drive 50. The lens drive 50 comprises a zoom lens terminal 51, a sharpness lens terminal 52 and a control terminal 53.

For driving the lens system 5, a plurality of characteristics elements for signal shaping are provided in the lens drive 50 (FIG. 4). Via the control terminal 53, an actuating variable for the electron beam recording element that defines the geometry of the recesses 22 to be produced is forwarded via a linearization unit 54 to a sharpness element 55, to timer units 56a, 56b and 56c, as well as to a zoom element 58. The input actuating variable is converted with characteristics in the sharpness element 55 into adjustment values for the focusing 12 that are supplied to the dynamic lens 37 of the focusing 12. The characteristics of the zoom element 58 convert the actuating variable into corresponding adjustment values for the focal distance setting 10 that proceed to the dynamic lens 31.

The clock acquired in the evaluation unit 42 and the sawtooth signal generated in the sawtooth generator 45 are employed for the chronological coordination of the method sequences in the manufacture of the recesses 22 (FIG. 4).

The time interval provided for the manufacture of a recess 22 corresponds to a cycle of the sawtooth signal 59 (FIG. 10), whereby the respective start of a time interval is marked by a clock.

Figure 8:
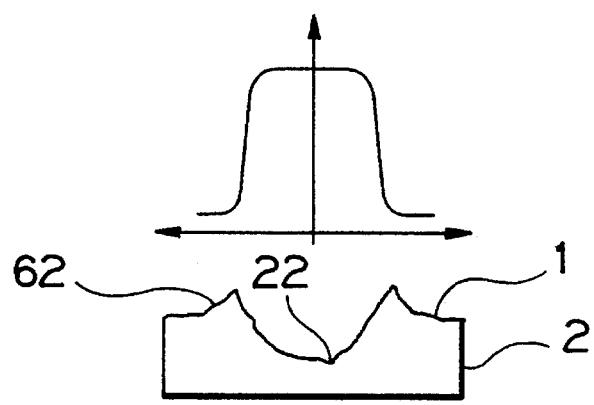
FIG. 8 is an allocation of an electron beam intensity to a charged surface during the production of a recess.
Figure 9:
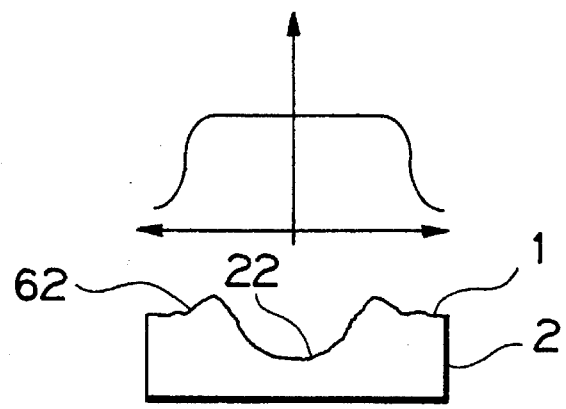
FIG. 9 is an allocation of an electron beam intensity to a charged surface during an after-treatment.
Figure 10:
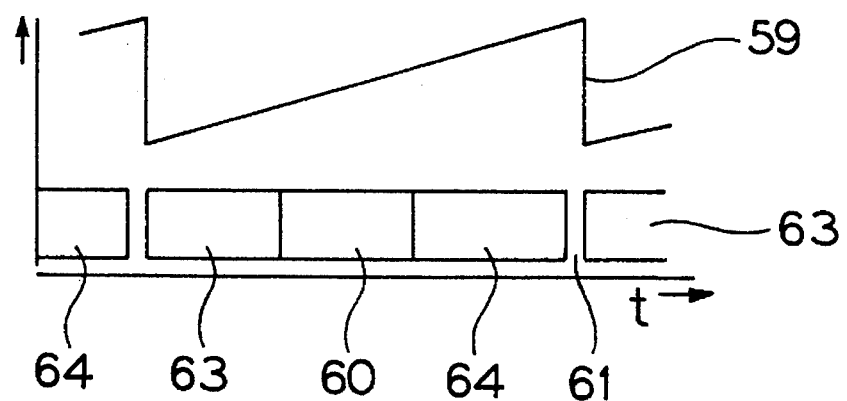
FIG. 10 is a time diagram directed to the allocation of pre-treatment, working and after-treatment intervals.

The time interval covers at least one working interval 60 and one intermediate interval 61. A pre-treatment interval 63 preceding the working interval 60 and/or an after-treatment interval 64 following the working interval 60 are also preferably provided (FIG. 10). During the working interval 60, the focusing 12 is controlled such that the electron beam 3 has an energy density that produces the recess 22 or respectively enlarges it. A slight melting of a crater wall 62 (FIGS. 8 and 9) surrounding the recess 22 occurs at least during the transition from the working interval 60 to the intermediate interval 61, this slight melting leveling irregularities that may be present.

Figure 11:
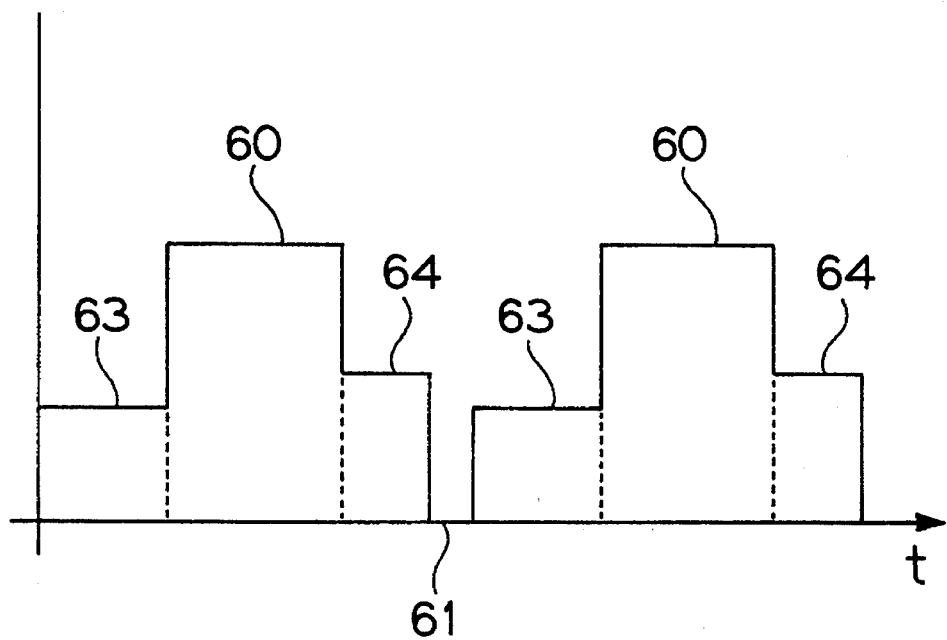
FIG. 11 is a time diagram of a multiple pulse drive wherein two successively following working intervals have a respective pre-treatment and after-treatment interval allocated to them.

A cleaning and a pre-tempering of the area occupied by the recess 22 and by the crater wall 62 occurs during the pre-treatment interval 63. A durable union of the crater wall 62 with the surface 1 is assured as a result of the pre-treatment. A melting of the crater wall 62 occurs for a defined time span during the after-treatment interval 64. In particular, it has been envisioned to provide at least two working intervals 60 during a time interval, the recess 22 being manufactured therein and these working intervals 60 being separated by a further intermediate interval 61 (FIG. 11). Fundamentally, it is also conceivable to allocate a plurality of cycles of the sawtooth signal 59 to the time interval and, for example, to provide a working interval during every cycle.

The respective chronological duration of the working interval 60, of the pre-treatment interval 63 and/or of the after-treatment interval 64 is calculated in the timer units 56a, 56b and 56c of the lens drive 50 (FIG. 4) dependent on the actuating variable, in that the actuating variable is converted with characteristics into the clock signals that define the respective chronological duration of the intervals.

The timer unit 56a that defines the chronological duration of the pre-treatment interval 56 is triggered by the clock at the control terminal 50'. After the expiration of the pre-treatment interval 63, the timer unit 56b that defines the chronological duration of the working interval 60 is activated by the timer unit 56a. After the expiration of the working interval 60, the timer unit 56c that defines the chronological duration of the after-treatment interval 64 is started by the timer unit 56b.

The clock signals acquired in the timer units 56a, 56b, and 56c are supplied to the sharpness element 55 and control the output of the various setting values for the focusing 12 in the pre-treatment interval 63, in the working interval 60 and/or the after-treatment interval 64.

A compensation of the relative motion of the texture drum 2 vis-a-vis the nozzle 39 can be undertaken via a follow-up of the electron beam 3. As a result thereof, the electron beam 3 remains exactly directed onto a preselected region and this leads to the formation of extremely symmetrical recesses 22. As a result of the extremely short time delays in the drive of the lens system 5, approximately 150,000 recesses 22 can be manufactured per second. Given employment of suitably fast control devices, it is also possible to realize clock frequencies of 300,000 through 600,000 recesses per second. In order to enable these clock frequencies, the texture drum is rotatorily charged with a rotational speed of approximately 10 revolutions per second and is provided with a suitable translational motion. Given a time span of approximately 16 microseconds for generating a recess 22, a complete texture drum 2 can be processed in approximately 45 minutes. The energy absorption by the texture drum amounts to only approximately 500 watts in this time. Undesirable variations in the region of the surface 1 due to thermal warpings or similar events are thus precluded with high probability. A time of approximately 1 microsecond has proven expedient as the time span for the intermediate interval 61. The recess 22 and the crater wall 62 occupies a region having a diameter of approximately 30 through 400 micrometers.

Although various minor changes and modifications might be proposed by those skilled in the art, it will be understood that we wish to include within the claims of the patent warranted hereon all such changes and modifications as reasonably come within our contribution to the art.

We claim:

1. A method for manufacturing a texture drum, comprising the steps of:

generating a surface structure in the form of recesses having respective crater walls surrounding the recesses in a surface region of the texture drum with an electron beam;

charging the surface region of the texture drum with the electron beam within working intervals wherein the electron beam within said working intervals has a respective energy density for forming said recesses; and providing respective after-treatment intervals following the respective working intervals and providing in said after-treatment intervals said electron beam with a respective relatively lower energy density selected so as to make contours of the recesses more uniform in shape and to reduce sharp edges and projections at the crater walls by melting of the crater walls.

2. A method according to claim 1 wherein a portion of the surface region corresponding in size to the recess to be generated as well as a crater wall surrounding the recess is charged by the electron beam within respective pre-treatment intervals preceding the respective working intervals.

3. A method according to claim 2 wherein at least one portion of the surface region is melted with the pre-treatment intervals.

4. A method according to claim 2 wherein the surface region charged by the electron beam within the pre-treatment intervals is cleaned of contaminants.

5. A method according to claim 1 wherein the electron beam tracks a motion of the texture drum at least during the working intervals.

6. A method according to claim 1 wherein the electron beam is more highly focused during the working intervals than during the after-treatment intervals.

7. A method according to claim 1 wherein a sharpness setting of the electron beam is provided both during the working intervals as well as during the after-treatment intervals.

8. A method according to claim 1 wherein a clocking of a focusing of the electron beam is implemented dependent upon a rotational positioning of the texture drum.

9. A method for manufacturing a texture drum, comprising the steps of:

generating a surface structure in the form of recesses having respective crater walls surrounding the recesses in a surface region of the texture drum with an electron beam;

charging the surface region of the texture drum with the electron beam within working intervals wherein the electron beam within said working intervals has a respective energy density for forming said recesses; and providing respective after-treatment intervals following the respective working intervals and providing in said after-treatment intervals said electron beam with a respective relatively lower energy density selected so as to provide a respective melting of the crater walls surrounding the respective recesses.

10. An apparatus for manufacturing a texture drum, comprising:

means for generating an electron beam for charging a surface region of the texture drum to create recesses therein having respective crater walls surrounding the recesses therein; and means for charging the electron beam within working intervals with a respective energy density that generates the recesses and for charging the surface region within after-treatment intervals following the working intervals with a relatively lower respective energy density chosen to provide a respective melting of the crater walls surrounding the respective recesses.

11. An apparatus for manufacture of a texture drum on which a surface structure is generated in a surface region by an electron beam, comprising:

vacuum chamber means for accepting the texture drum;

a beam generator means connected to the vacuum chamber means for producing the electron beam;

focal length means having a first lens system with a long focal length which comprises a static lens and a dynamic lens and having a second lens system with a short focal length;

a focusing means having a third lens system comprising a static lens and a dynamic lens;

a first control means connected to the beam generator means;

a second control means connected to the focal length means and to the focusing means; and said second control means comprising a time control means connected to at least one of said focal length means and said focusing means for time/dependent control of energy density of the electron beam by adjusting at least one of said dynamic lens of said focal length means or said dynamic lens of said focusing means wherein energy density of the electron beam is controlled such that the surface region of the texture drum within the working intervals is respectively charged with an energy density that generates the surface structure in a form of recesses having respective crater walls surrounding the recesses, and is charged within after-treatment intervals following the working intervals with a respective relatively lower energy density providing a respective melting of the crater walls surrounding the respective recesses.

* * * * *